(12) United States Patent
Kicksee

(10) Patent No.: US 8,214,986 B2
(45) Date of Patent: Jul. 10, 2012

(54) VALVE STEM PULLER

(76) Inventor: Randall (Sam) Clayton Kicksee, Wasalette (CA)

( * ) Notice: Subject to any disclaimer, the term of this patent is extended or adjusted under 35 U.S.C. 154(b) by 383 days.

(21) Appl. No.: 12/458,822

(22) Filed: Jul. 23, 2009

(65) Prior Publication Data

US 2010/0018022 A1    Jan. 28, 2010

(51) Int. Cl.
  *B23P 19/04* (2006.01)
  *B66F 3/00* (2006.01)
  *B65D 85/28* (2006.01)

(52) U.S. Cl. ........... 29/221.5; 29/264; 29/267; 254/131; 206/372

(58) Field of Classification Search ............ 29/221.5, 29/267, 264; 254/131; 206/372, 373
See application file for complete search history.

(56) References Cited

U.S. PATENT DOCUMENTS

| | | | |
|---|---|---|---|
| 1,969,225 A | 6/1931 | Lear | |
| 2,282,387 A | 8/1940 | Todd | |
| 2,304,271 A * | 12/1942 | Merriman et al. | 81/125 |
| 2,503,373 A * | 4/1950 | Browning et al. | 81/177.7 |
| 2,679,654 A | 10/1950 | Hosking | |
| 2,699,810 A | 11/1953 | Ferguson | |
| 2,940,167 A * | 6/1960 | Boyer et al. | 29/221.5 |
| 3,208,133 A * | 9/1965 | Morton | 29/801 |
| 3,387,354 A | 6/1968 | Mossberg | |
| 3,769,683 A * | 11/1973 | Krekeler | 29/267 |
| 3,928,902 A * | 12/1975 | Seims et al. | 29/221.5 |
| 4,294,301 A | 10/1981 | Lutz | |
| 4,528,735 A * | 7/1985 | Eastridge et al. | 29/221.5 |
| 5,102,100 A * | 4/1992 | Troncoso, Jr. | 254/129 |
| 5,301,924 A * | 4/1994 | Kammerer | 254/131 |
| 6,095,016 A * | 8/2000 | Lam | 81/121.1 |
| 6,145,413 A * | 11/2000 | Lin | 81/63.1 |
| 6,186,033 B1 * | 2/2001 | Faro, Sr. | 81/177.7 |
| 6,543,112 B1 * | 4/2003 | Knaebel | 29/221.5 |
| 7,698,972 B2 * | 4/2010 | Hi | 81/177.8 |
| 2008/0127472 A1 * | 6/2008 | Whitehead et al. | 29/221.5 |

* cited by examiner

*Primary Examiner* — Lee D Wilson
*Assistant Examiner* — Alvin Grant

(57) ABSTRACT

A valve stem puller or holder, comprising an elongated handle with a clevis at one end, the clevis being formed by two side portions, and a hollow, partly cylindrical stem connector pivotally mounted between the side portions and movable between a first position in which the stem connector is coaxial with said handle and a second position in which the axis of the stem connector is at a large angle to the handle. The stem connector has an inner end in the form of a nipple configured to receive air pressure supply means, and the base of the handle between the side portions has a spring mounted detent element positioned so as to interact with the inlet of the nipple to releasably hold the stem connector in place.

1 Claim, 5 Drawing Sheets

VALVE STEM PULLER

BACKGROUND OF THE INVENTION

1. Field of the Invention

The present invention relates to a tool for use while inflating a tire of the type having an inner tube, and where the inner tube is inflated while inside the tire by means of a valve stem which protrudes outwardly through a dimensioned hole in the tire rim. Such tires are commonly used in bicycles, motorcycles and tractors.

Inflating the inner tube of a tire can be a challenging task particularly from an initial, deflated condition due to the required manipulation and alignment of the valve stem of the inner tube. The valve stem must sometimes be pulled through the hole in the tire rim, and must be held in position during the inflation process. There is a need for an effective way to keep the valve stem aligned and positioned in the stem hole to prevent it from being pushed back into the interior of the tire assembly during inflation of the tube, or to become misaligned sideways.

2. Prior Art

One prior patent showing a tool that is designed to hold or pull a valve stem during inflation is described in U.S. Pat. No. 4,528,735, issued Jul. 16, 1985 to Eastridge et al. This has two parts, one of which is an elongated handle part with a bifurcated end providing two side portions forming a clevis, the two side portions extending from a base between inner ends of the side portions, the base being provided with a recess. The side portions have slots which pivotally and slidably receive a transverse pin holding a stem puller or stem connector part. This latter part is a generally cylindrical body with an axial bore, having an outer end portion terminating in an internally threaded cylindrical section adapted for attachment to a valve stem, and having an inner end portion configured as a nipple to receive air pressure supply means. The valve stem connector is movable relative to the handle between a first position in which it is aligned with the handle and in which its inner end portion is received in the recess in the base of the clevis, and a second position in which the stem connector lies at a large angle to the handle axis. To go from the first to the second position the stem connector needs to be firstly moved axially so that its inner end portion is pulled out of the recess in the handle while the transverse pin slides in the slots of the clevis side portions. A magnet releasably holds the inner end of the stem connector part in the recess.

SUMMARY OF THE INVENTION

The present invention has some features similar to those of the '735 patent, namely an elongated handle part and a generally cylindrical valve stem connector part; however the means for releasably holding the stem connector in its first position, aligned with the handle, is much simplified. In the present invention, the base of the handle part has a spring mounted detent element projecting from the base between the clevis side portions, and positioned so as to interact with the inlet of the air inlet nipple to releasably hold the stem connector in place. There is thus no need for axial movement of the stem connector in moving from one position to the other, but only a simple pivoting, nor is there any need for a magnet. The air inlet nipple serves the dual purpose of being an inlet for the air and a part of the detent mechanism.

BRIEF DESCRIPTION OF THE DRAWINGS

A preferred embodiment of the invention will now be described by way of example with reference to the accompanying drawings, in which.

DETAILED DESCRIPTION

Figure 1:
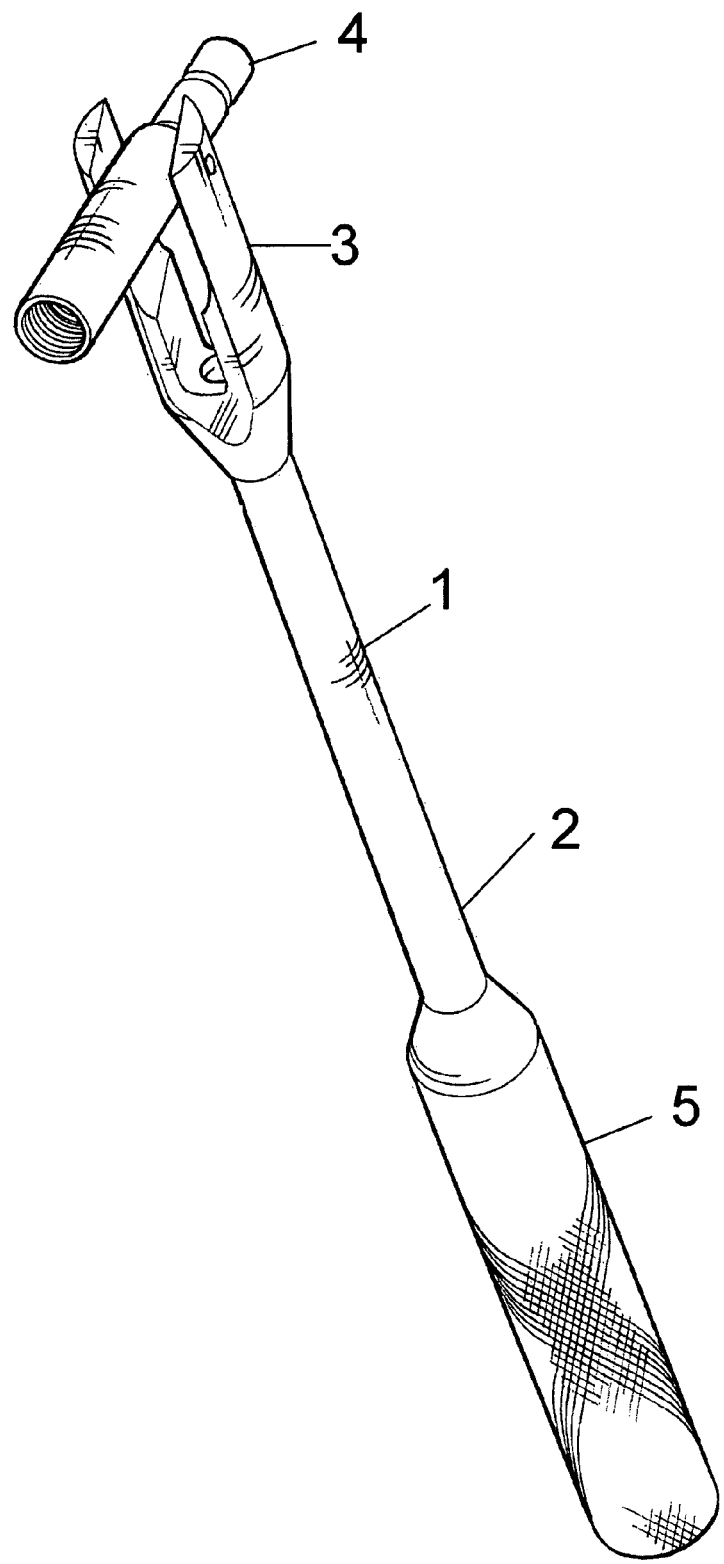
FIG. 1 shows a perspective view of the whole tool.
Figure 7:
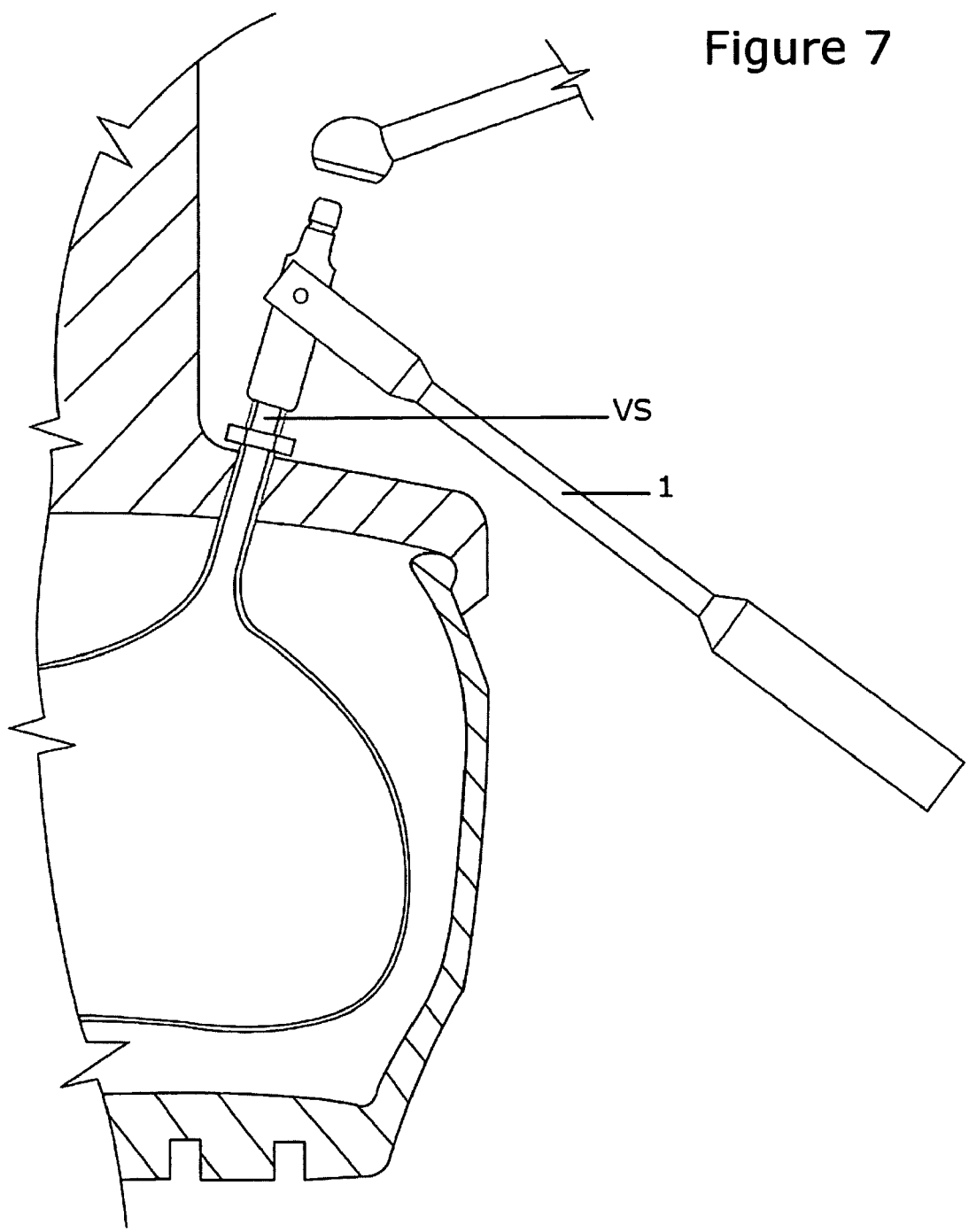
FIG. 7 shows the tool in use with parts of a tire and pressure hose also shown.

FIG. 1 shows a tool which may attach to a valve stem, such as the stem VS shown in FIG. 7, to provide a means to align and position the stem with respect to the stem hole in the tire rim during the inflation process. As shown in FIG. 1, the tool of the invention comprises an elongated handle part 1 with a straight shaft 2 and, at the outer end, a clevis 3 which pivotally mounts a stem connector part 4. The other end of the handle provides an enlarged grip portion 5 to assist the user.

FIGS. 2 to 6 show further details of the clevis and stem connector. The clevis 3 has two side portions 3a extending outwardly from a base 3b which joins inner ends of the side portions. The side portions support a pin 20 (?) which passes through a bore in the central portion of the stem connector 4 transverse to its axis, and which provides a pivot allowing the stem connector to be moved through a large angle from the position of FIG. 3, where it is aligned with he handle, to the position of FIG. 1 where it is at a large angle to the handle. The "large angle" should preferably be close to 90 degrees, and at least 45 degrees.

Figure 3:
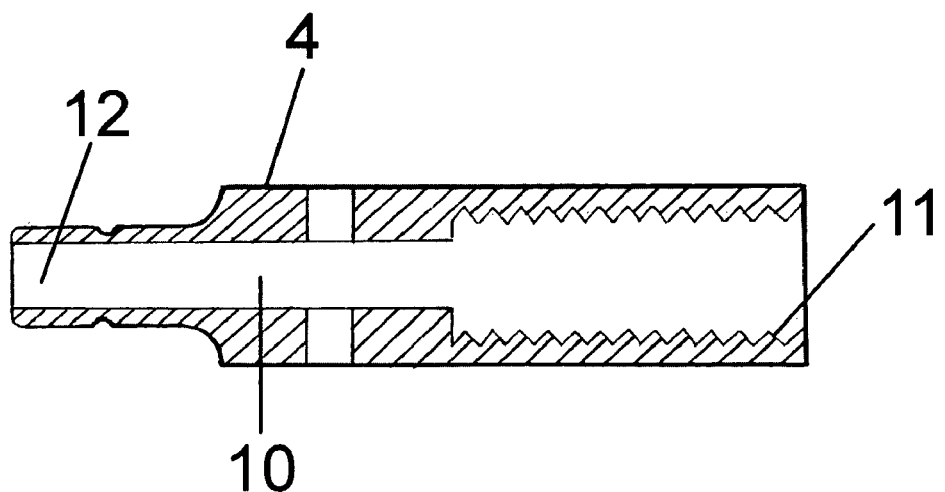
FIG. 3 shows a longitudinal section through the stem connector part.
Figure 4:
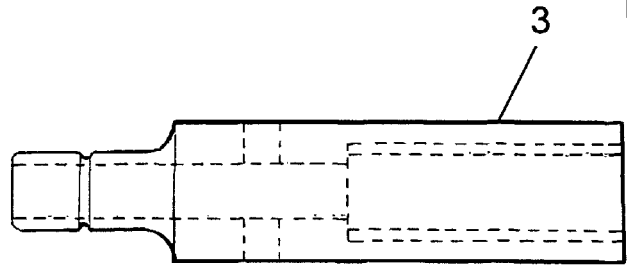
FIG. 4 is a side view of the stem connector part.

As shown in FIG. 3, the stem connector 4 has an axial bore providing an air passage 10 to allow airflow therethrough from a compressed air source. At an inner end it has a nipple 12 for attachment to the air source, such as an air hose, and at the outer end an internally screw threaded, cylindrical portion 11 is provided to allow it to threadedly engage the threads of a valve stem.

Figure 2:
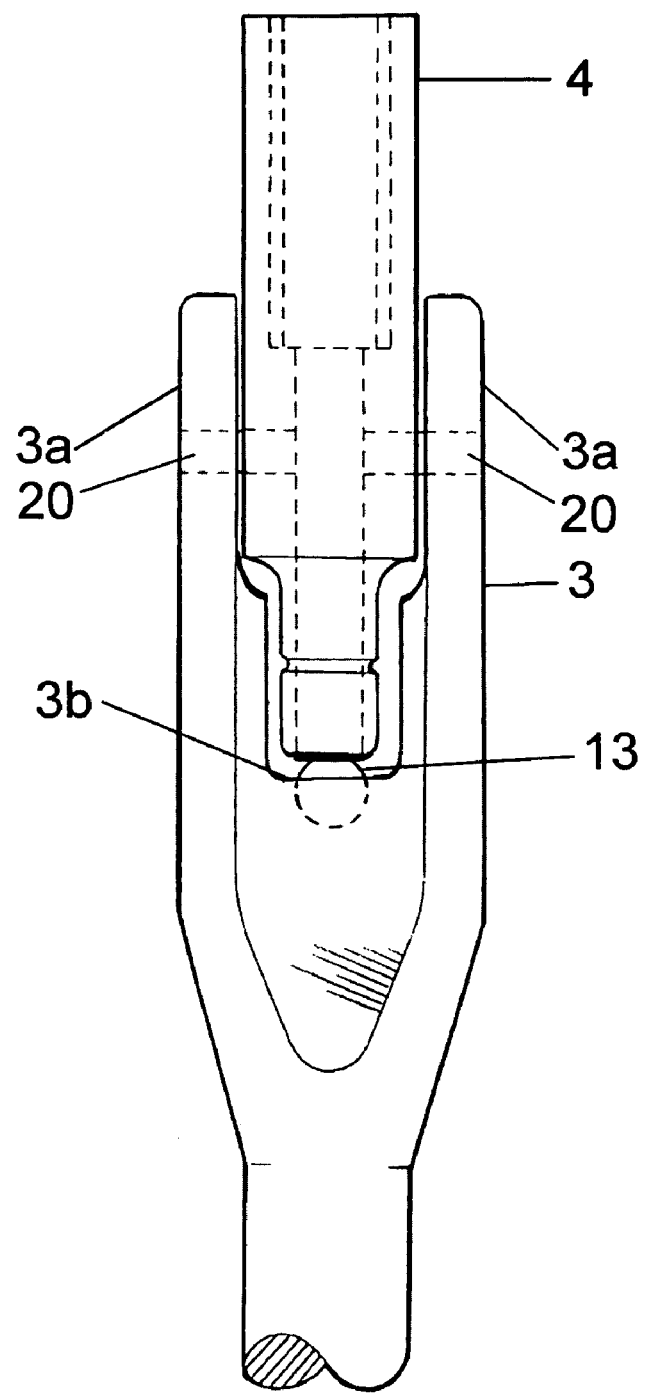
FIG. 2 shows an elevation of the operative part of the tool, with handle and stem connector part aligned.
Figure 5:
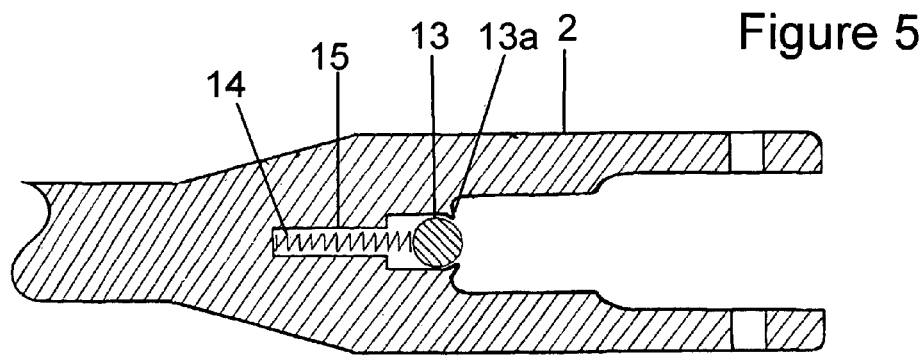
FIG. 5 is a longitudinal section through the clevis part of the handle.
Figure 6:
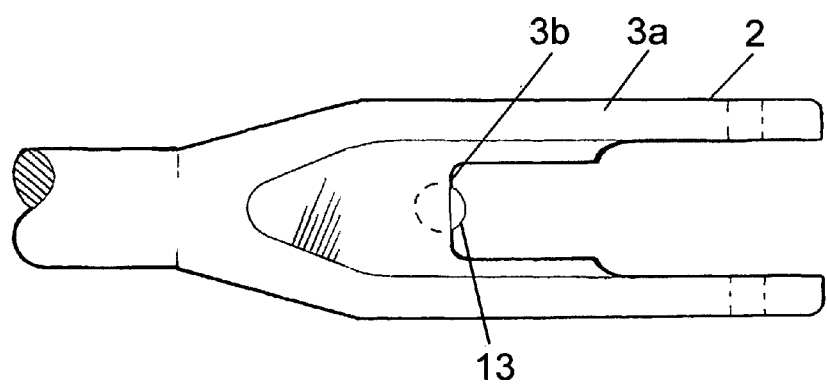
FIG. 6 is a side view of the clevis part of the handle.

As shown in FIGS. 2, 5 and 6, a spring loaded locking or detent mechanism is provided to releasably hold the stem connector 4 in alignment with the handle 1 to facilitate manipulation of the stem connector, especially when threading this onto the valve stem. In accordance with the invention, the nipple 12 does double duty in the sense that it not only provides the attachment means for a source of air pressure, but also provides part of this detent mechanism. The other part of this detent mechanism is provided by a spring loaded spherical ball 13 which is retained in a cylindrical recess 13a in the base of the clevis between inner ends of the side members 2; any similar retaining means such as ledge 13a for the ball 13 may be provided. The ball 13 is urged outwardly by a spring 14 compressed between the bottom of a bore 15 in the base of recess 13a and the ball 13. As shown in FIG. 2, when the ball is in its outermost position it fits partially into the end of the inlet nipple 12, of the stem connector 4. This provides a detent mechanism which releasably locks the stem connector 4 in alignment with the handle part 1. This detent is released by applying a small force on the stem connector perpendicular to the handle portion to push the ball 13 inwardly into the bore 15, thus freeing the stem connector 4. It can be seen that the spring loaded detent ball 13 permits pivoting of the stem connector 4 with respect to the clevis 3, and this allows for a range of locations for attachment of the air supply to the open end of the valve stem. The nipple end 12 of the stem connector is thus exposed to allow for connection to the fitting of a compressed air hose.

An air supply is then directly applied to the nipple 12 of the stem connector to inflate the tire. The tool prevents the valve stem from being pushed back into the tire. While the operation of the tool is similar to what is shown in the prior '735 patent mentioned above, it is simpler in operation than the prior device, needing only simple pivoting of the stem connector 4, without any sliding movement, and is simple in construction in using the nipple end as part of the detent mechanism. The device of this invention is also simpler than that of the '735 patent in that the stem puller 4 has a simple, straight-through passageway, without any means to open the tire valve, and without the "valve core" referred to in the '735 patent, which is needed in that design to control airflow once the tire valve has been opened.

Further advantages which are inherent in the valve stem puller may be obvious to those skilled in the art. The embodiment described herein is for illustration as is not meant to limit the scope of the invention as claimed. Variations of the forgoing embodiment will be evident to a person of ordinary skill and are intended by the inventor to be encompassed by the following claims.

I claim:
1. A valve stem puller or holder, comprising:
a handle part having an elongated handle with a clevis at one end, the clevis being formed by two side portions extending from a base between inner ends of said side portions;
a hollow, partly cylindrical stem connector pivotally mounted between said side portions and rotatably movable between a first position in which the stem connector is co-axial with said handle and a second position in which the axis of the stem connector is at a large angle to the axis of the handle;
said stem connector having opposing ends comprising an outer end terminating in an internally threaded cylindrical portion adapted for attachment to a valve stem, and an inner end terminating in a nipple configured to receive air pressure supply means, and an axial bore extending between said outer end and said inner end to allow for airflow therethrough;
characterized in that said base of the handle part has a spring mounted detent element projecting from said base portion comprised of a ball outwardly urged by a spring housed in a recess in said base of the clevis and positioned so as to interact with the inlet of said nipple to releasably hold the stem connector in place.

* * * * *